United States Patent [19]

Burns

[11] Patent Number: 5,760,515
[45] Date of Patent: Jun. 2, 1998

[54] ELECTRICAL POWER GENERATING APPARATUS AND AN ELECTRICAL VEHICLE INCLUDING SUCH APPARATUS

[76] Inventor: David Johnston Burns, Broomhall Castle Nursing Home, Mentstria, Clackmannanshire FK11 FEA, Great Britain

[21] Appl. No.: 425,056

[22] Filed: Apr. 19, 1995

[30] Foreign Application Priority Data

Apr. 19, 1994 [GB] United Kingdom ............... 9407695

[51] Int. Cl.$^6$ .................................................... H02K 7/18
[52] U.S. Cl. ........................... 310/115; 180/65.3; 290/55
[58] Field of Search ........................... 310/114, 115, 310/68 D; 180/65.3; 290/55, 44

[56] References Cited

U.S. PATENT DOCUMENTS

| | | | |
|---|---|---|---|
| 3,060,336 | 10/1962 | Liimatainen et al. | 310/68 D |
| 4,039,848 | 8/1977 | Winderl | 290/55 |
| 4,424,452 | 1/1984 | Francis | 290/55 |
| 5,057,726 | 10/1991 | Mole et al. | 310/67 R |
| 5,184,040 | 2/1993 | Lim | 310/114 |
| 5,506,453 | 4/1996 | McCombs | 290/44 |

FOREIGN PATENT DOCUMENTS

| | | |
|---|---|---|
| 0 394 565 | 10/1990 | European Pat. Off. |
| 3844505 | 7/1990 | Germany . |
| 476226 | 6/1936 | United Kingdom . |
| 492489 | 11/1937 | United Kingdom . |
| 604225 | 6/1948 | United Kingdom . |
| 2 013 597 | 8/1979 | United Kingdom . |
| 2 026 092 | 1/1980 | United Kingdom . |
| 2 057 584 | 4/1981 | United Kingdom . |
| 2062977 | 5/1981 | United Kingdom . |
| 1593969 | 7/1981 | United Kingdom . |
| 2071428 | 9/1981 | United Kingdom . |
| 2271536 | 4/1994 | United Kingdom . |

*Primary Examiner*—Steven L. Stephan
*Assistant Examiner*—Judson H. Jones
*Attorney, Agent, or Firm*—Reid & Priest L.L.P.

[57] ABSTRACT

A fan assembly (7) is provided for driving an electricity generator, especially for use in the production of electrical power in an electrical vehicle, wherein the fan assembly (7) functions by virtue of an air flow created by forward motion of the vehicle, the fan assembly (7) comprising two adjacent fan blade sets (14A, 14B) mounted on respective co-axially arranged hubs (13), the blades of the sets (14A, 14B) being oppositely set so that the blades (14A, 14B) and their hubs (13) rotate in contra-directions when subject to impingement by an air flow. An electricity generator (15, 15A) is also provided for use with the above fan assembly (7), the generator comprising an excitable magnetic field producing component (armature) 25 (43) and an induction electric power producing component 15 (42) which are mounted for separate rotation, especially in contra-directions by the above fan assembly (7). The generator can be located in one of the fan hubs (13).

15 Claims, 14 Drawing Sheets

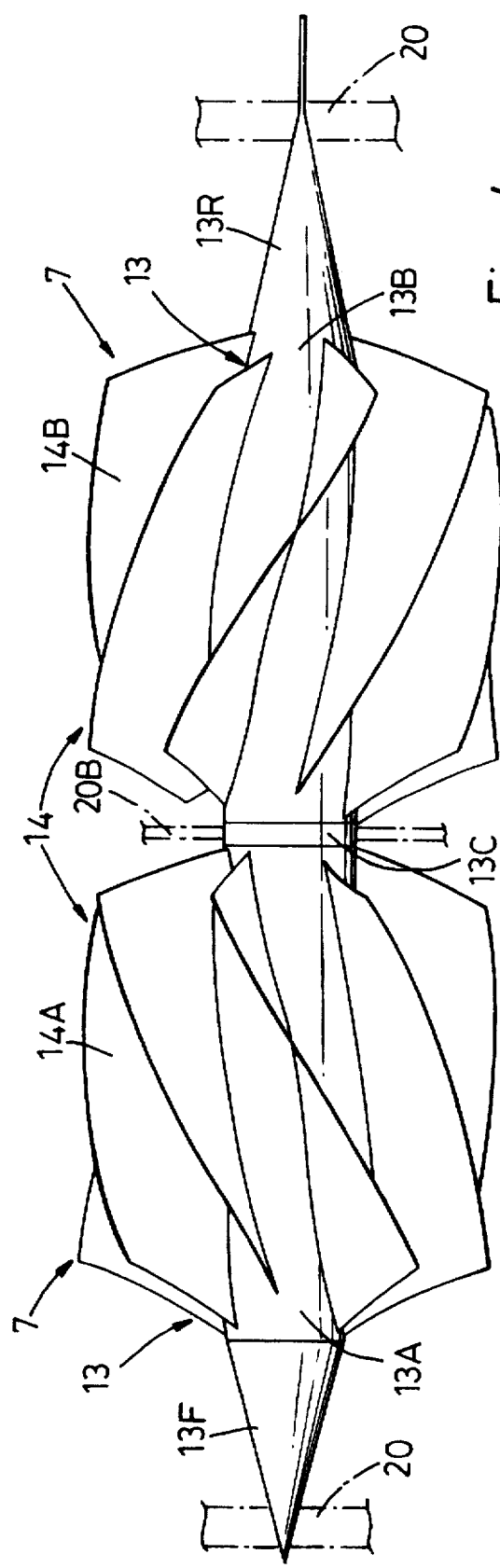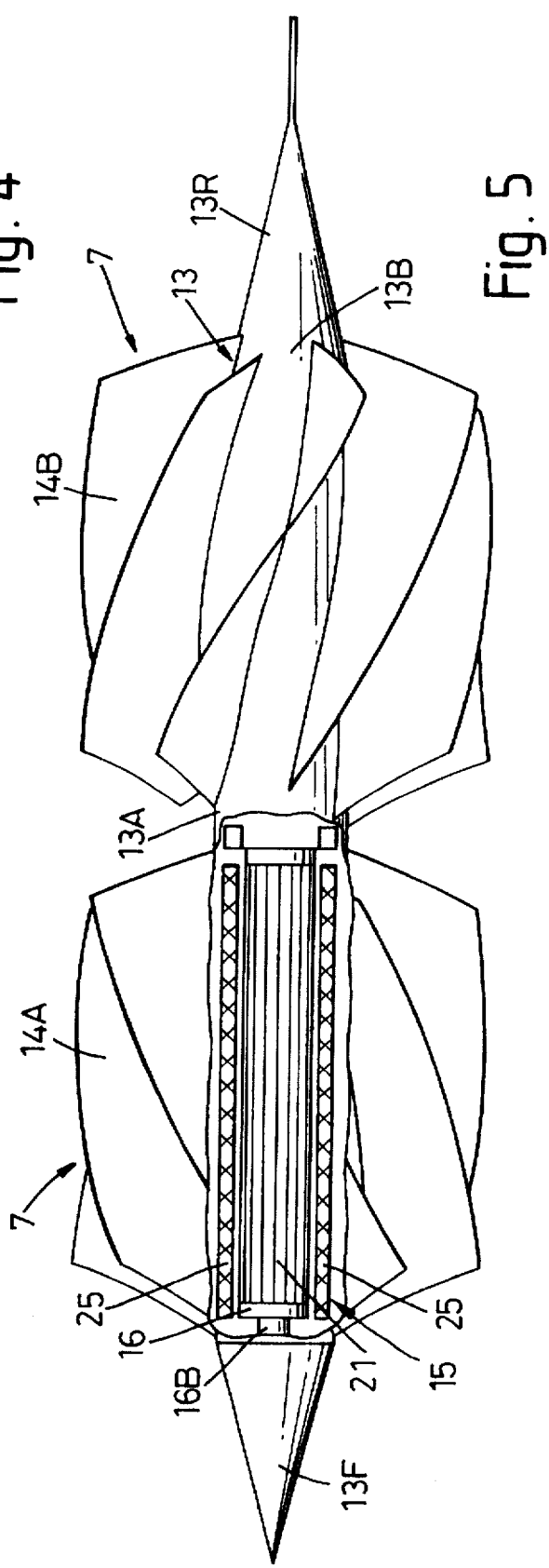

ELECTRICAL POWER GENERATING APPARATUS AND AN ELECTRICAL VEHICLE INCLUDING SUCH APPARATUS

The present invention relates to electricity generating apparatus and to an electrical vehicle, including such apparatus especially but not exclusively road going vehicles. More especially the electrical vehicle comprises an electrical vehicle in accordance with the invention of the applicant's U.K. Patent Application No. 9 321 189.4 (publication No. 2 271 536 A).

Electricity generating apparatus in the form of an alternator is well established and conventionally comprises an outer stator providing armature windings and a central rotor with induction coils to provide rotating magnetic fields which interactwith the armature windings to provide alternating current outputs the d.c. current to the induction coils being fed for example via slip rings. In the present specification, the component with the armature windings is referred to as the "armature component" while the component providing the induction coils is referred as the "induction component". U.K application 2 271 536 A discloses an alternator wherein, in contrast to the conventional arrangement, the armature component (the outside component) rotates while the central induction component is stationary. The present invention is especially concerned with alternators driven by the power of fluid flows e.g. wind or water, and more especially to a wind driven turbine/alternator unit for use beneficially in the electrical vehicle described in GB-A 2 271 536 A. In this electrical vehicle, the turbine/alternator unit is located in the rear section of a tunnel extending from front to rear of the vehicle and is driven by wind flow passing through the tunnel due to forward motion of the vehicle. For the provision of improved performance in this vehicle, it is a requirement that the turbine/alternator unit has a low drag factor and is capable of producing a satisfactory electrical power output, and it is the principal object of the present invention to provide electricity generating apparatus meeting this requirement.

According to the present invention there is provided an electricity generator of a form having its length substantially greater than its diameter, said generator comprising a first set of electrical component members defining an excitable magnetic field producing component and a second set of electrical component members defining a power producing component, one of said sets of electrical components being carried by a rotary shaft while the other set is carried by a hub surrounding said shaft and capable of rotating in the direction contrary to the rotary direction of said shaft, said shaft and hub being separately rotatable, the electrical component members of said first and second sets extending radially to the shaft with the component members of one set alternating in close side-by-side relationship with the component members of the other set, the component members of the sets comprising an annular array of segments, each segment comprising an individual pair of spaced segmental shaped plates with an electrical winding supported between the plates, supply means for supplying excitation current to said first set of electrical component members, and discharge means for delivery of electrical power from the second set electrical component members.

The present invention also provides electricity generating apparatus including a fan assembly and the inventive generator as above defined, the fan assembly comprising two adjacent fan blade sets mounted on respective-coaxially arranged hubs, the blades of the sets being arranged for rotation in contra-directions when subject to impingement by a fluid flow, one of the fan sets driving one of said components of the generator while the other fan set drives the other component of said generator.

In particular one of the fan sets can drive an armature component of the generator while the other fan set drives the induction component of the generator. Consequently, these two components of the generator rotate in opposite directions, thus to provide an improved electricity output as electricity generation is proportional to the speed in which the electromagnetic fields of the induction component intersect the armature windings of the other component.

Further, it has been found that the provision of the contra-rotating fans reduce the drag factor of the fan assembly to a low level. The front hub of the fan assembly is preferably provided with a tapering or conical nose, while the rear hub can have a similarly shaped end portion.

The blades can be helically arranged on their hubs and preferably have an axial length greater that their radial dimensions, but it would be possible to have different dimensions of the blades, especially for applications of the invention other than the preferred electrical vehicle, for example with the blade radial dimension equal to or even greater than the axial dimension.

Embodiments of the present invention will now be described by way of example with reference to the accompanying drawings wherein:

FIG. 4 shows a side view of a fan assembly usable for producing electricity for the car;

FIG. 5 shows asimilar view to that of FIG. 4 but with a portion open to show the internal alternator arrangement for electricity production;

Figure 1:
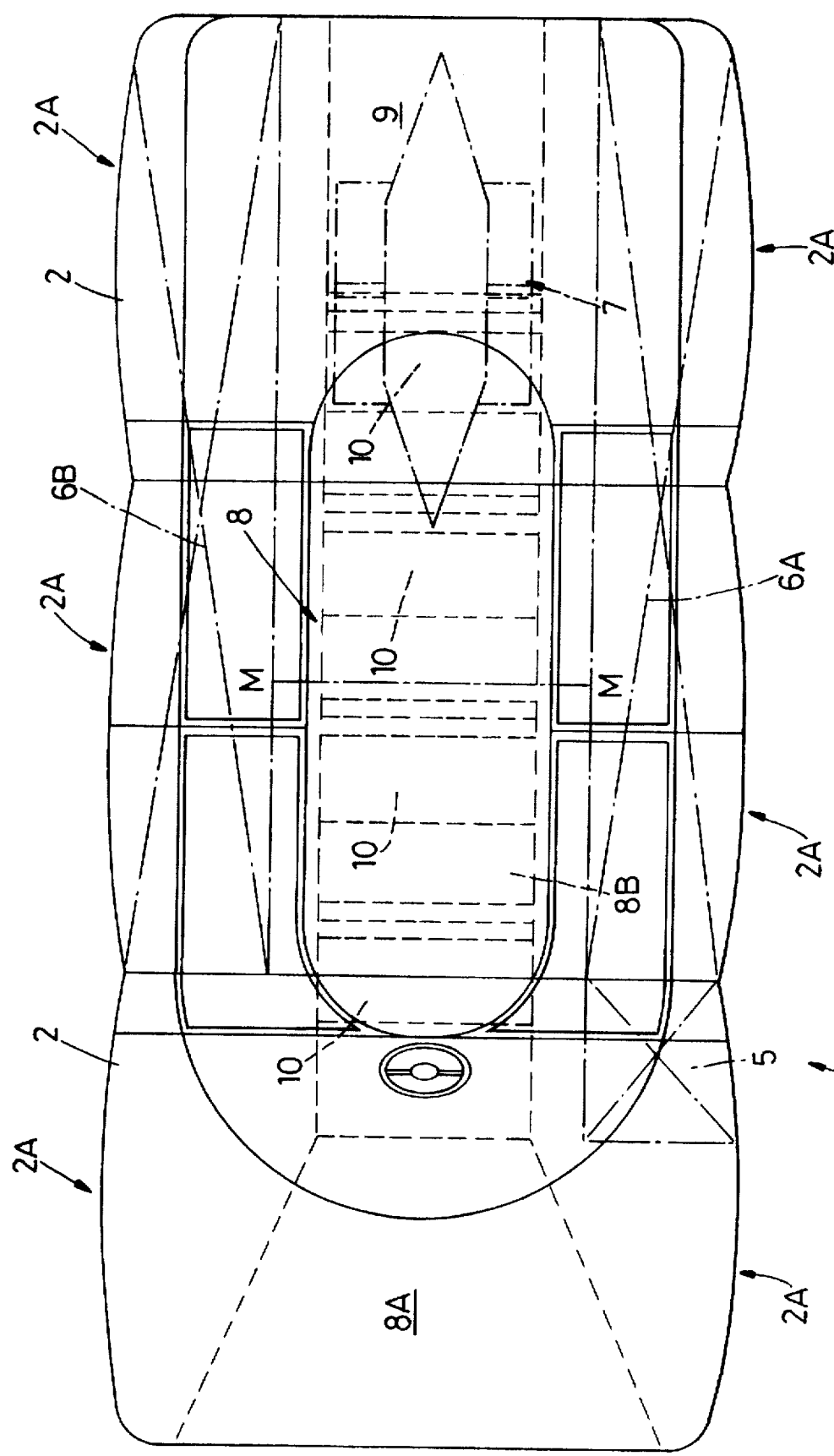
FIG. 1 shows a plan view of an electric car in accordance with the present invention.
Figure 2:
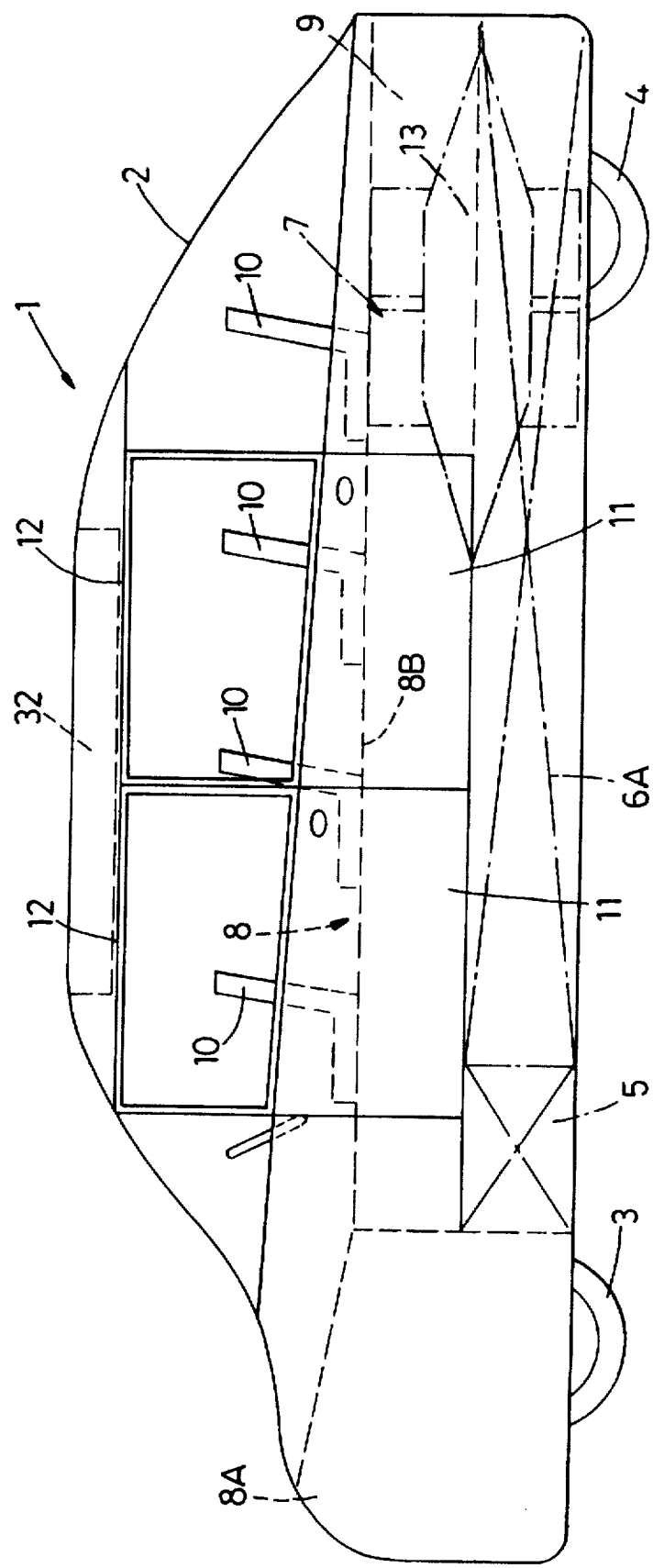
FIG. 2 shows a side elevation of the electric car of FIG. 1.
Figure 3:
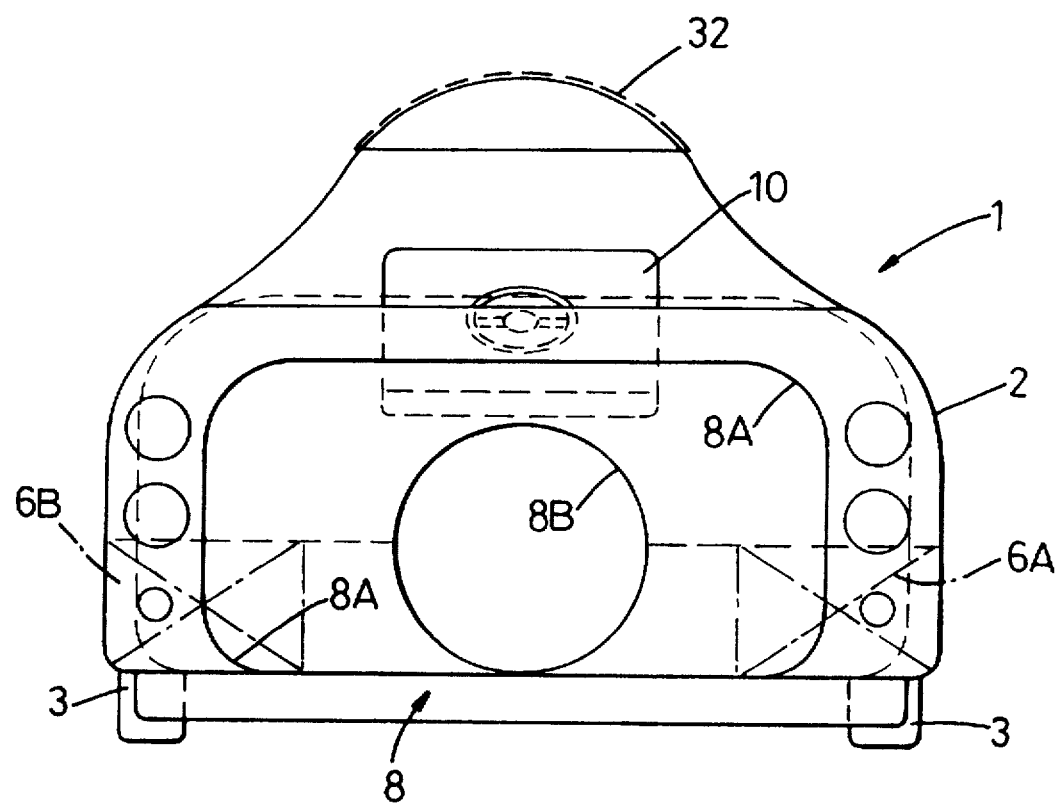
FIG. 3 shows a front view of the car.

Referring to FIGS. 1 to 3, an electrical car 1 comprises bodywork 2, pairs of ground engaging wheels 3, 4 front and rear, an electric motor 5 driving the front wheels 3 through a suitable transmission (not shown) and electrical battery sets 6A, 6B for supplying electrical power to the motor 5. Suitable control gear (not shown) adapted for operation by the car driver serves to control operation of the electric motor 5 and hence motion of the car 1.

Additional energy generation means are provided in the car and comprise an air turbine fan/alternator set 7 located at or towards the rear of the car 1, first ducting 8 (or tunnel) leading from the front of the car through the bodywork 2 to the turbine/alternator set 7, and discharge ducting 9 from the set 7, the ducting 8 serving for the passage of air to the turbine by virtue of motion of the car 1 for driving of the turbine. The ducting 8 located centrally in the car comprises an inlet bell-mouth portion 8A and a following tunnel portion 8B leading to the turbine 7, the battery sets 6A, 6B being located adjacent the sides of the bodywork 2, on either side of the tunnel portion 8B. In this example seating 10 for the driver and passengers is located longitudinally along the tunnel portion 8B.

As can be seen from FIG. 3, the front area of the bell-mouth 8A constitutes the major portion of the frontal cross-sectional area of the bodywork 2, representing more than half the bodywork frontal area. The bell-mouth 8A could be readily increased to the size shown dashed in FIG. 3. The cross-sectional area of the tunnel portion 8B will be selected at a suitable value compatible with the seating and other arrangements of the car. For example the tunnel 8B could have a cross-sectional area of about 1.13 $m^2$, obtained for example by having the circular cross-section shown of a diameter of about 600 mm.

The ducting 8 could be arranged to constitute a major support structure (chassis) of the bodywork, i.e. define a spine form chassis member. Access to the passenger compartment is via "gull" wing doors 11 each upwardly pivotal about an upper longitudinal axis 12.

The turbine/alternator 7 comprises a fan drum assembly 13 carrying two sets of fan blades 14A, 14B. Each fan blade set 14A, 14B is carried by its separate hub portion 13A, 13B so that the fan sets 14A, 14B can rotate separately from each other, the drum 13 including a stationary central ring portion 13C which can support the hub portions 13A, 13B. The blades of each fan set 14A, 14B, are of elongate form with an axial length greater than the radial dimension and arranged helically on the respective hub portions so that the fan sets 14A, 14B are of opposite hand. Consequently wind flow over the fan sets 14A, 14B causes the fan sets to rotate in opposite (contra) directions. The front hub 13A includes a cone 13F with its apex forward encouraging a smooth air-flow from the tunnel portion 8B onto the turbine fan 13/14 while the rear hub has a similar conical portion 13R at the rear. The fan 13/14 and the alternator advantageously constitute a rotary unit defining an electrical generator. Thus, the alternator 15 (FIG. 5) comprises a central shaft 16 of hollow form connected to the hub portion 13B with the hub portion 13A surrounding the shaft 16. The fan assembly 13/14 can be carried by suitable supports 20 front and rear, while a radial support 20B for example in the form of rods can be provided at the central portion 13C. Both the supports 20 will be linked to stationary parts of the hub cones.

Figure 20:
FIG. 20 is a pictorial view of an electric car embodying the present invention.

Wire coils 25 (FIG. 5) are provided on the under side of hub portion 13A to constitute the armature component of the alternator, while the rotary shaft 16 carries the induction coils 21 constituting the induction component of the alternator. The manner of supplying the exciting current to the coils 21 for electromagnetic field production and the manner of electrical power take-off from the alternator 15 can be by any means known in the art, but the techniques described in GB-A-2271536 should be particularly useful in this connection. It will be noted of course that the shaft 16 is not stationary in the present arrangement but rotates contrary to the rotating windings 25 on hub portion 13A. The coils are of copper and the other alternator parts can be suitable material, in particular the hubs can be of steel. The turbine/alternator 7 serves to charge the battery sets 6A, 6B during motion of the car. In particular the fan drum portions 13A, 13B are driven in opposite directions by the air flow through the ducting 8, increased effect being present where the car is driven into the wind, and by having the turbine 7 at the rear of the car the turbine 7 will be influenced by the naturally produced reduced pressure conditions at the rear of the car to give improved fan performance. The battery sets 6A, 6B will be such as to provide the desired driving capacity, but charging of the batteries 6A, 6B by the turbine/alternator 7 during driving of the car will substantially reduce the charge reduction of the batteries during travel, so giving increased range. Charging of the batteries 6A, 6B from an external source e.g mains supply need only be carried out at increased intervals. It would be possible to have the motor 5 powered by one of the battery sets 6A, 6B while the other set is being charged by the turbine/alternator 7. The batteries will be of suitable voltage, e.g. 12 v, 24 v or 240 v. A motor 5 of suitable horsepower will be selected e.g. 20 H.P. but motor power will be chosen to give the desired maximum car speed which could be 70 M.P.H. (38 KM/HR) or even greater. Providing the bodywork 2 with curving (bowed) external wall portions 2A (especially as shown in FIG. 20) should improve the aerodynamics at higher speeds. It will be appreciated that the large-size smooth-from opening at bell-mouth 8A will enable airflow to pass smoothly through the car thereby reducing the air resistance of the bodywork 2.

Additional charging of the batteries could be obtained by employing solar cell panelling 32 on the bodywork, and this panelling may be expandable and also swingable so as to be settable to catch the sun rays. The panelling 32 could charge dedicated batteries.

Whereas the above embodiments concern a car, the present invention could be applied to other vehicles e.g. in vans and trucks, and also in railway vehicles (power units/locomotives) and possibly even in high-speed boats.

It could be possible to have the alternator 15 driven by some other power source than the fan turbine 13/14. Also, the windings (coils) of the alternator 15 could be of a material other than copper, for example silver or a silver alloy including for example platinum or titanium.

Figure 6:
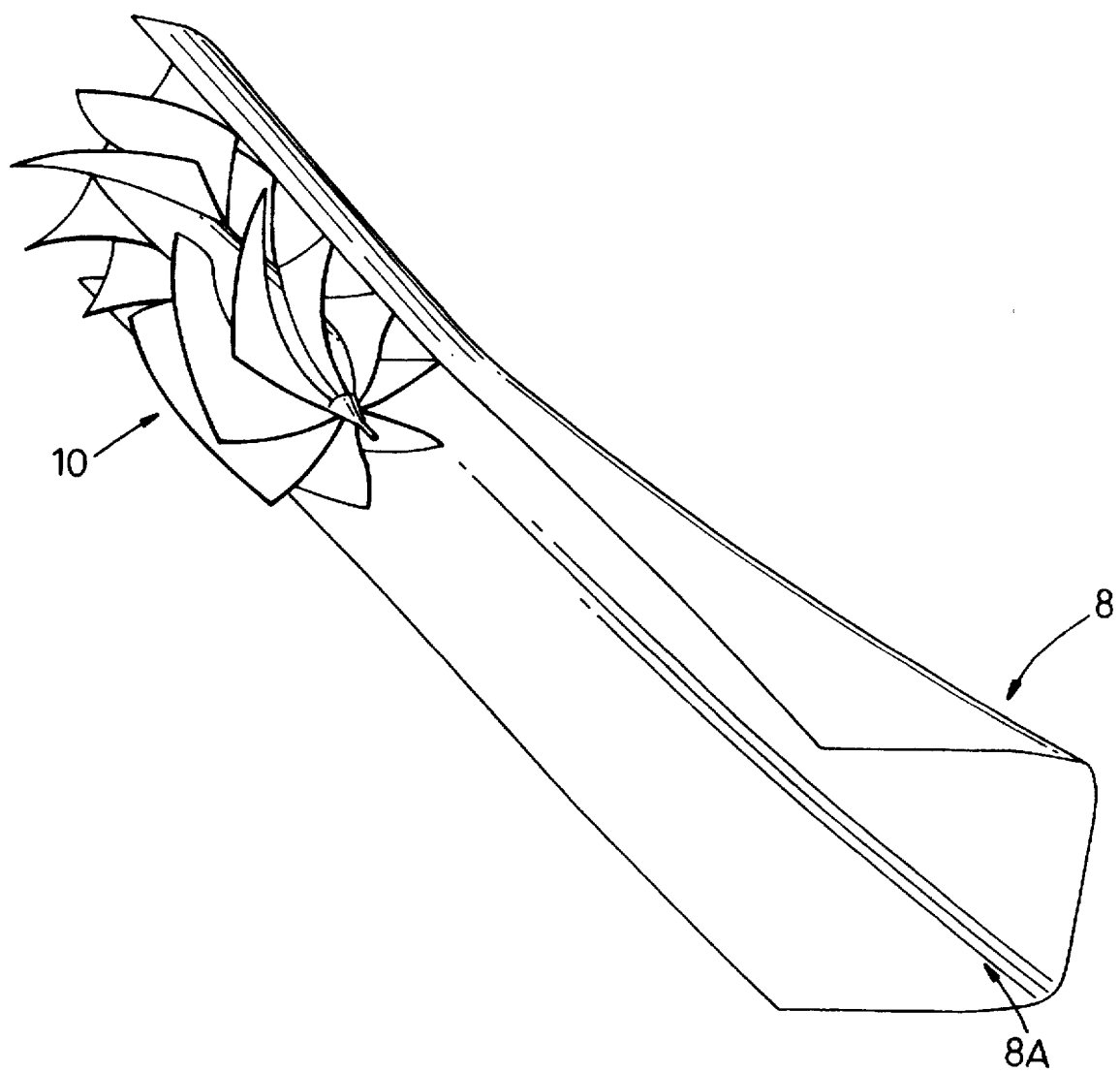
FIG. 6 shows a schematic pictoral view of a preferred form of air tunnel for the car with the above fan assembly installed.

FIG. 6 shows a particularly useful form of tunnel 8 for use with the present double blade-set turbine/alternator 7. Thus the front of the tunnel (at portion 8A) can be of rectangular cross-section for example of size 54 in×27 in (137 cm×68 cm), while the central portion i.e. at section M—M (FIG. 1) can be of oval form e.g. 46"×27" (117 cm×68 cm) and the rear portion housing the turbine/alternator can be of conical form 24 ins (61 cm to 27 ins (69 cm). The tunnel could have a length of about 15 ft (4.6 m) while the turbine/alternator 7 could have a length of about 6 ft (1.8 m) with a maximum blade dia of 24 ins (61 cm) and hub/drum diameter 8 ins (30 cm).

FIGS. 9 to 19 show another embodiment of electricity generator (alternator) 15A for use in the turbine/alternator 7, this embodiment being of a more detailed and practical form than that shown in FIG. 5. Thus the generator 15A comprises a rotary hub 40 on a central, preferably hollow, shaft 41 which is also rotatable, an induction power generating component in the form of an axial array of disc devices 42 joined to the hub 40, and an excitable component in the form of an axial array of disc devices 43 joined to the central shaft and interleaving with the disc devices 42. A small axial clearance is present between adjacent discs 42, 43 to permit contra-rotary movement between the discs 42, 43. In this embodiment power take-off from the induction component 42 and supply of excitation current to the excitable component 43 is achieved by a contactless arrangement by means of similar transformers 44A, 44B for the electrical power take-off and a smaller transformer 45 for the excitation current supply. The two components 42, 43 are caused to rotate in opposite (contra) directions by coupling the hub 40 and shaft 41 to respective fan sections 14A, 14B.

Figure 10:
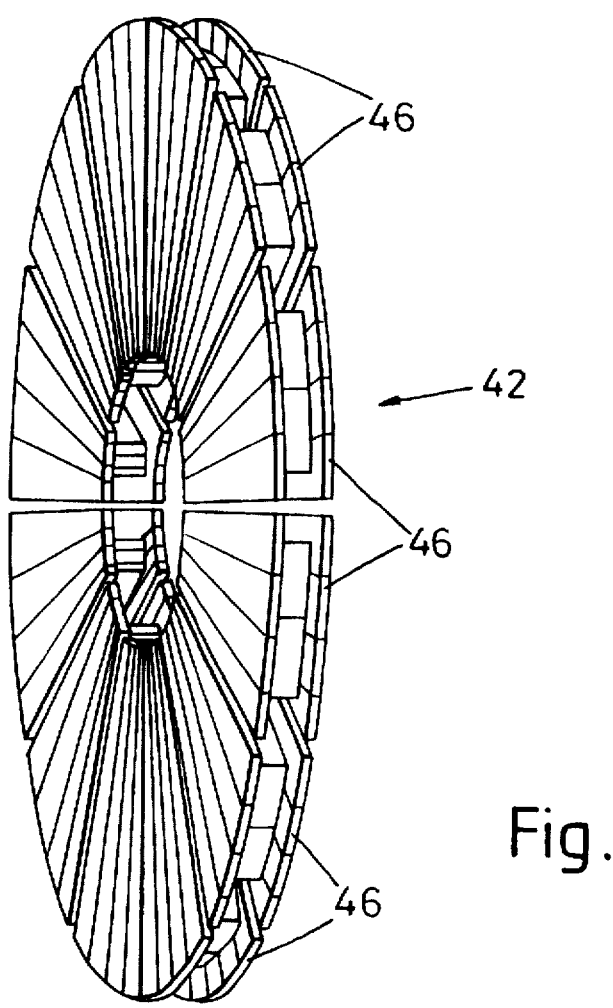
FIG. 10 shows a pictorial view of the disc form electricity generating unit with magnetic conductors as assembled in the generator of FIG. 1.
Figure 11:
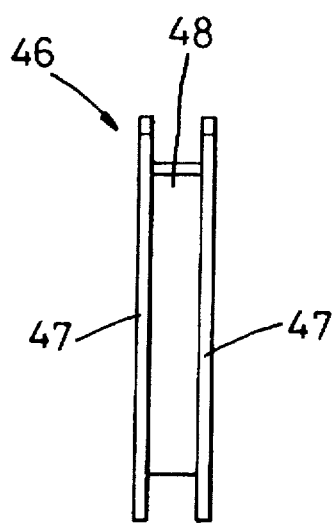
FIGS. 11 and 12 show respectively side and front views of a segment of the unit of FIG. 6.
Figure 12:
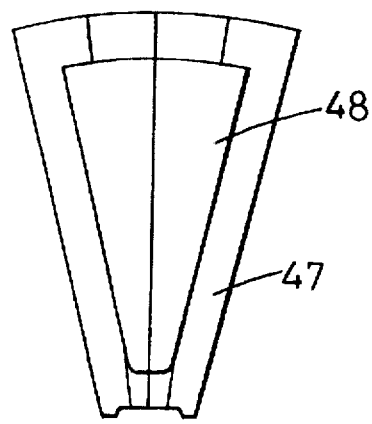
Figure 13:
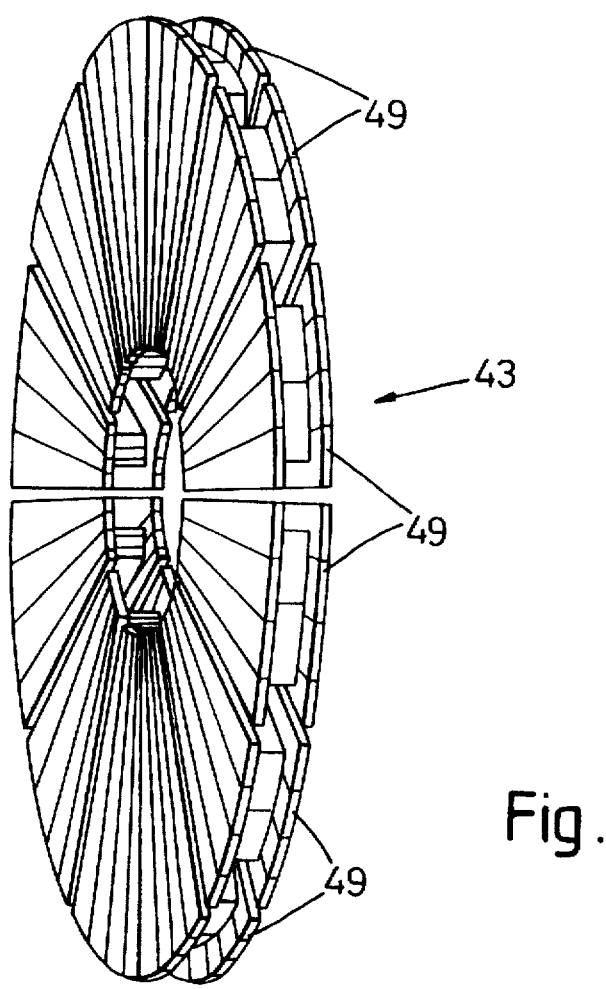
FIGS. 13, 14 and 15 show similar views to FIGS. 10 to 12 of the matnetic excitation (or magnetic armature) unit of the genrator.
Figure 14:
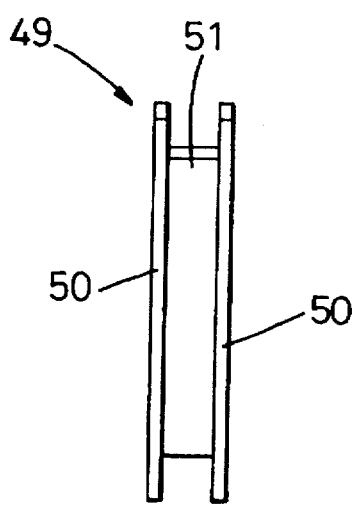
Figure 15:
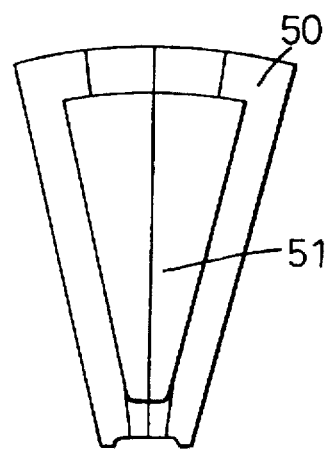
Figure 19:
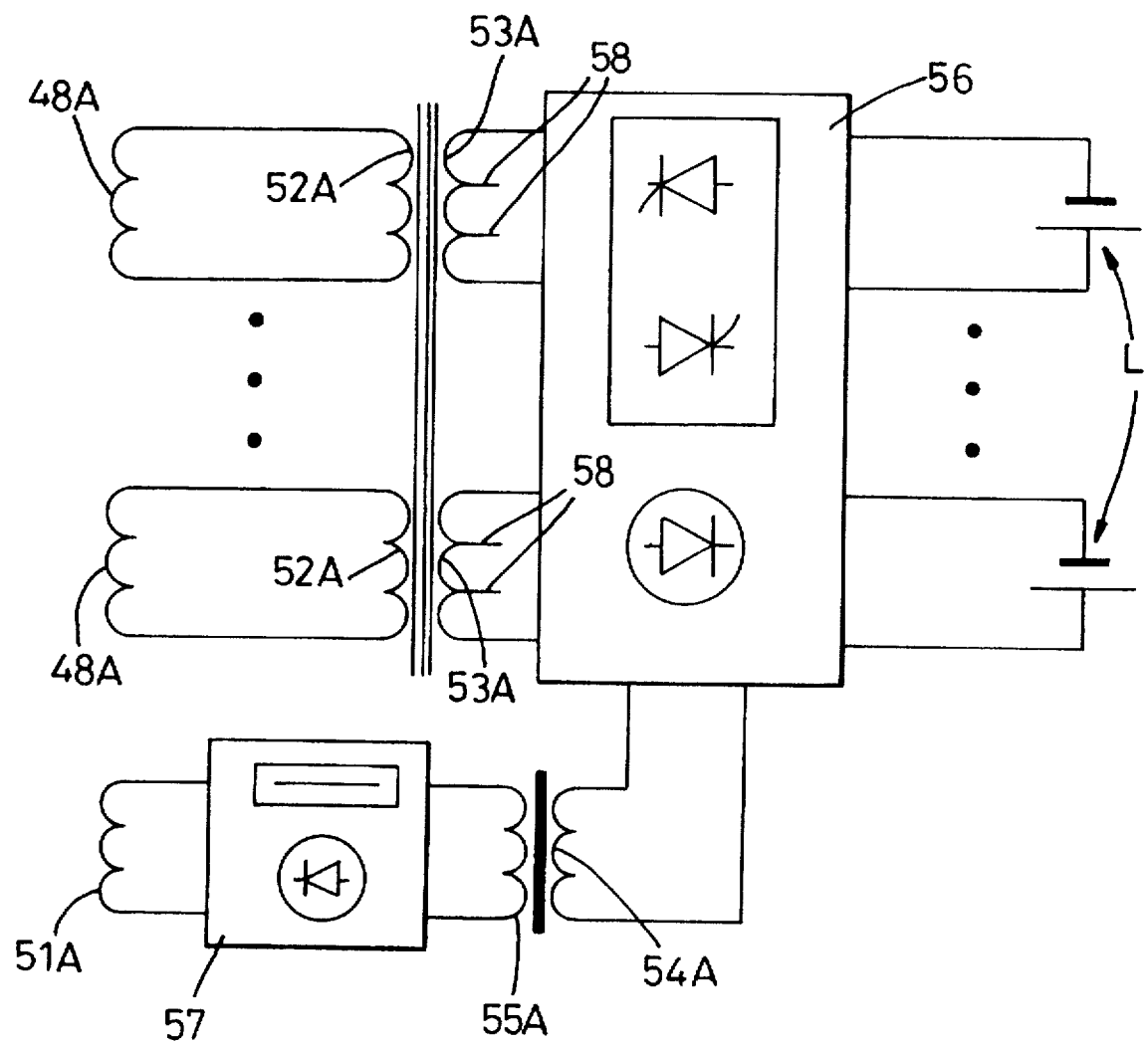
FIG. 19 is a circuit diagram, showing the connecton of the coils.

FIG. 10 shows in greater detail the construction of a disc 42 in its assembled condition within the hub 40. Thus the disc 42 comprises an annular array of magnetic conductors 46 constituting segments of the disc, each formed by a pair of spaced polar plate assemblies 47 carrying a core or shoe 48 serving to receive the magnetic coils 48A (FIG. 19) of the component. The disc 43 of the excitable component is similar as can be seen from FIGS. 13–15, being formed by magnetic conductor segments 49 each comprising spaced polar plates 50 carrying a core or shoe 51 for the component coils 51A (FIG. 19).

The transformer 44A, 44B for contactless take-off of electrical power is of annular form and comprises an outer primary section 52 (FIG. 17) rotating with the induction (power) component 42 and being supplied with the produced electrical current from the power component 42. The produced current is transformed to the stationary secondary section 53 of the transformer 44A (B) whence the current can be fed to the supplied entity/load i.e. batteries 6A/6B. A suitable rectifier can be provided for d.c. current provision to the load.

The exciting current to the excitable component 43 is fed via a similar but much smaller transformer 45. In this case the outer secondary section 54 (FIG. 18) is stationary, and the primary section 55 of the transformer 45 rotates with the shaft 41 for convenience current supply to the excitable component 43. Both of the transformers can have armoured cores. Transformation in both transformers 44A (B) and 45 can be straight (i.e. 1:1) without change in current and voltage, but step-up or step-down transformer ratios could be utilised if desired.

Each core/shoe 48 of the generator component and shoe 51 of the excitable component is wound with a selected number of loops/coils of wire. Thus each shoe 48 can have 9 loops of wire of 4 mm² cross-section, whereas the shoe 51 will have more loops for example 36 of only 1 mm² wire cross-section. The power transformers 44A (B) can contain a plurality of independent sections, say 6, each with a selected number of wire loops e.g. 100, again with a 4 mm² wire cross-section, whereas the coils of the exciting transformer 45 can contain the same number of loops, say 200 loops each of the same wire.

Coils of the discs 42 of the generator component are connected in series so that the magnetic poles on each disc 42 of the component will alternate, and the coils of the poles of the discs 43 of the excitable component are connected in the same way. The summary coil of each disc 42 of the generator component can be linked with a respective primary coil section of the power transformer 44A (B), so that for example to one of the power transformers 44A (B) 6 disc sections of the generator component are connected while 6 disc sections are connected to the other transformer 44A (B). The coils of the disc sections 43 of the excitable component are linked with the primary coil of the excitation transformer 45: to provide the necessary direct current for excitation the current from the transformer 45 is fed through a current limiter/rectifier 57 (FIG. 19).

Figure 16:
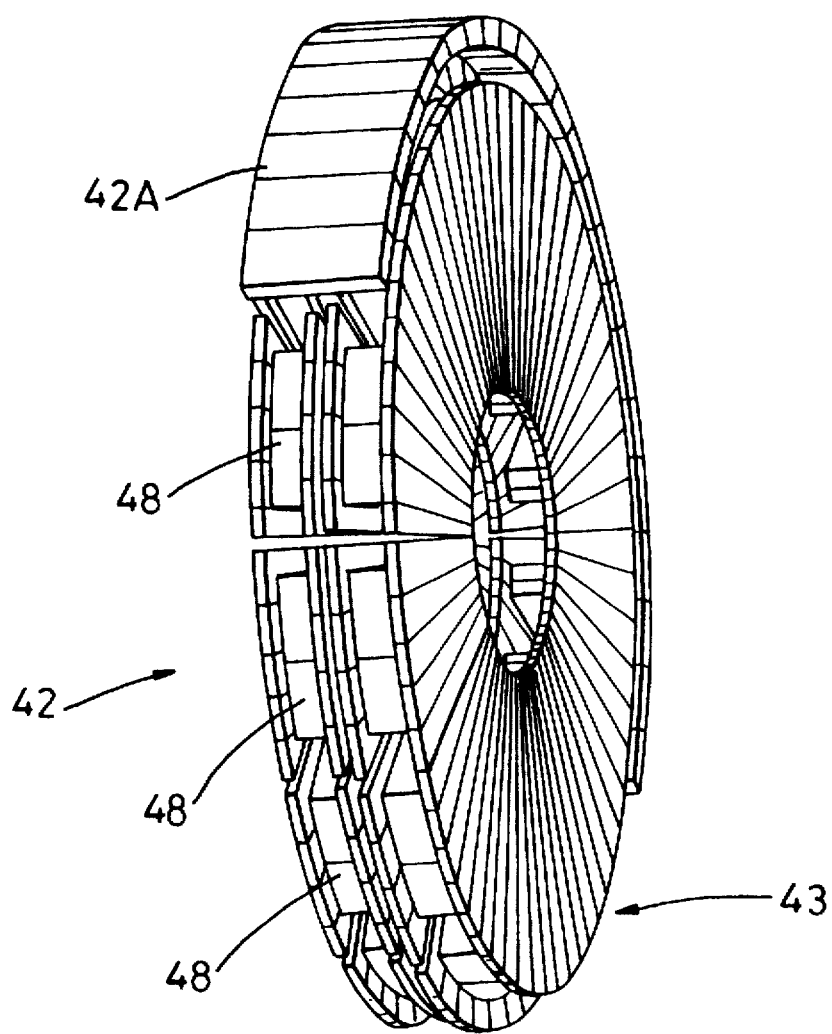
FIG. 16 shows a pair of the units of FIGS. 10 and 13 in side-by-side array as located in the generator.
Figure 17:
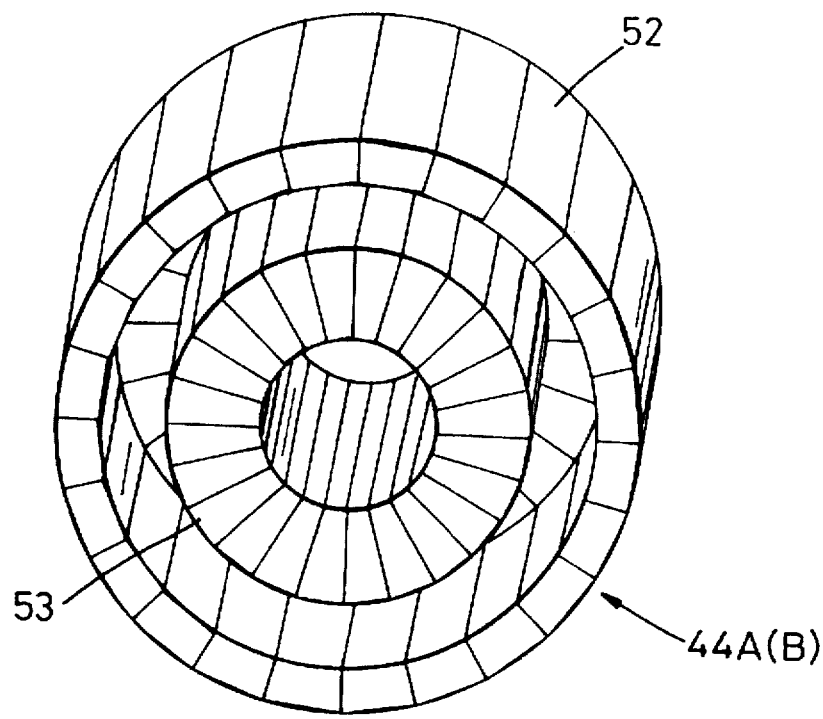
FIG. 17 shows in pictoral view a suitable arrangement for one of the transformer units in the generator for contactless take-off of the electrical power output from the generator.
Figure 18:
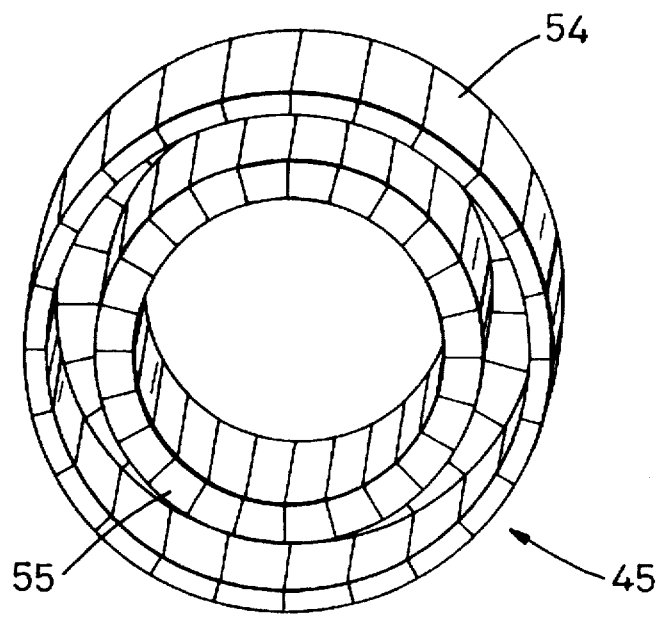
FIG. 18 shows a similar view of a transformer supplying the excitation current for the magnetic excitation unit.

FIG. 16 shows means 42A for power supply to the transformer 44A (B).

FIG. 19 shows a suitable control circuit for the alternator 15A. Thus the sector coils 48A of the generator disc sections 42 feed to the primary coils 52A of the power transformer 44A (B) while the transformers secondary coils 53A feed to the load L i.e. batteries 6A/6B via a regulator 56. Current from the regulator 56 is fed to the secondary coil 55A of the excitation transformer 45 while the current from the primary coil 54A of this transformr is fed to the summary coil 51A of the disc sections 43 of the excitable component via the limited/rectifier 57. The secondary coils 53A of the power transformer 44A (B) can have tappings 58 for stepped regulation of the discharged voltage.

An advantage of the alternator 15A is that it can give satisfactory electrical power output even when the outer diameter of the alternator is relatively small. As will be understood there are design constraints to the maxiumum diameter of the turbine/alternator 7 possible with the electrical car, and since a certain size of blade is necessary for a satisfactory level of turbine power the size of the blade hub and consequently the alternator diameter is restricted. The design of the alternator 15A assists in overcoming this problem.

By way of example the alternator 15A may have an overall length of about 1 meter with a maximum external diameter (dia. of disc 42) of about 190 mm, while the dia of shaft 41 (i.e. inner dia. of disc 43) can be about 52 mm. Clearance between the discs 42, 43 may be about 0.1 mm and preferably no more than 0.5 mm.

It is desirable for the alternator to have as low a weight as possible, and whereas it will be necessary for magnetic conductors of the alternator to be of suitable steel, i.e., electrotechnical steel (or transformer iron) where possible other parts can be of light material e.g. aluminium. It is expected the alternator 15A need not weigh much more than about 150 Kg. of which the power transformrs 44A (B) may contribute about 105 Kg. The weigtht may be reduced by using mechanical current collection with collector rings and brushes instead of the contactless transformer arrangements but the alternative mechanical contact system has the disadvantage of increasing frictional resistance and steps should be taken to ensure that this resistance is as low as possible with the mechanical system.

Figure 7:
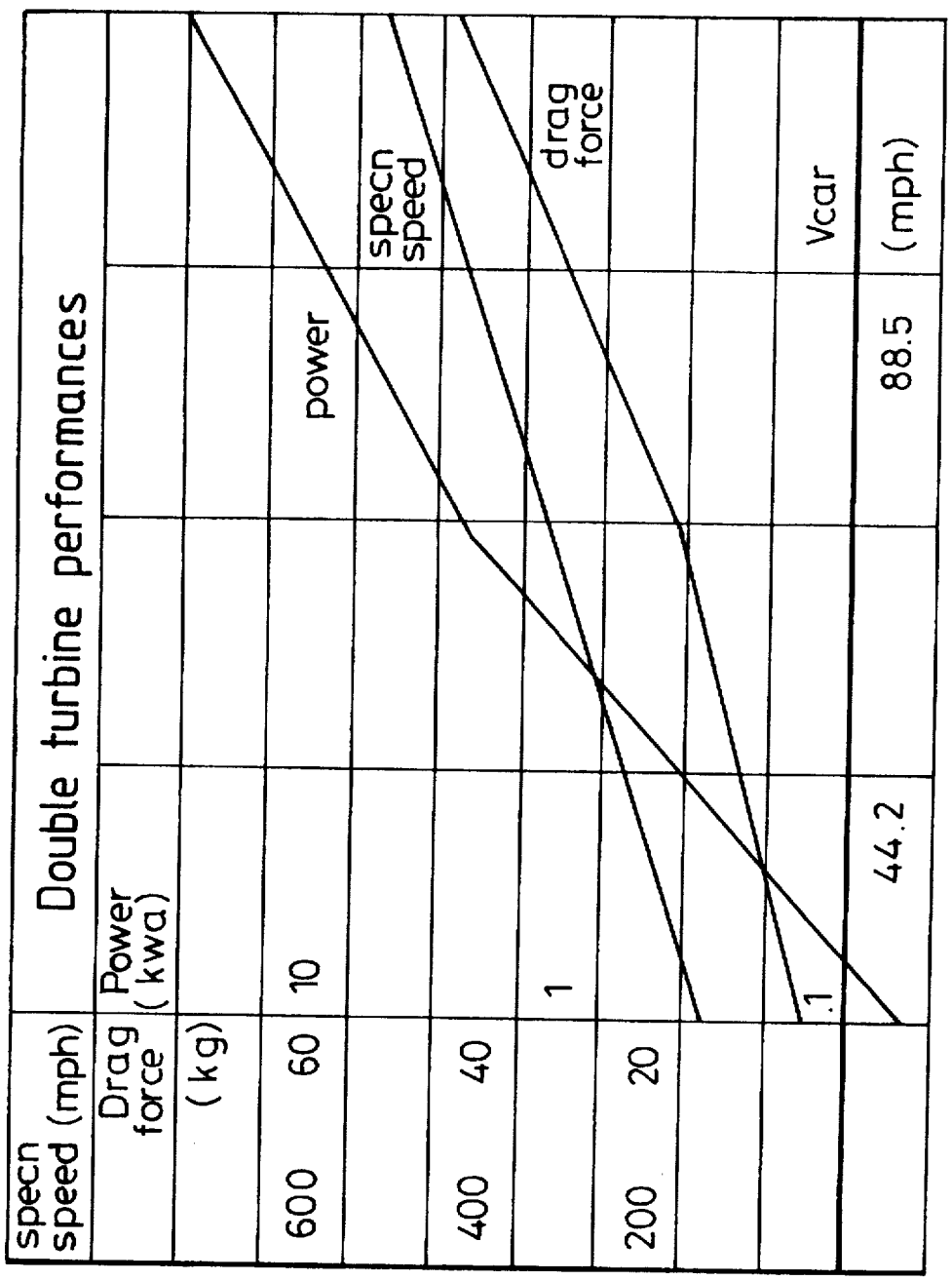
FIG. 7 is a graph illustrating the performance achieved by the double-fan (turbine) of FIG. 4.
Figure 8:
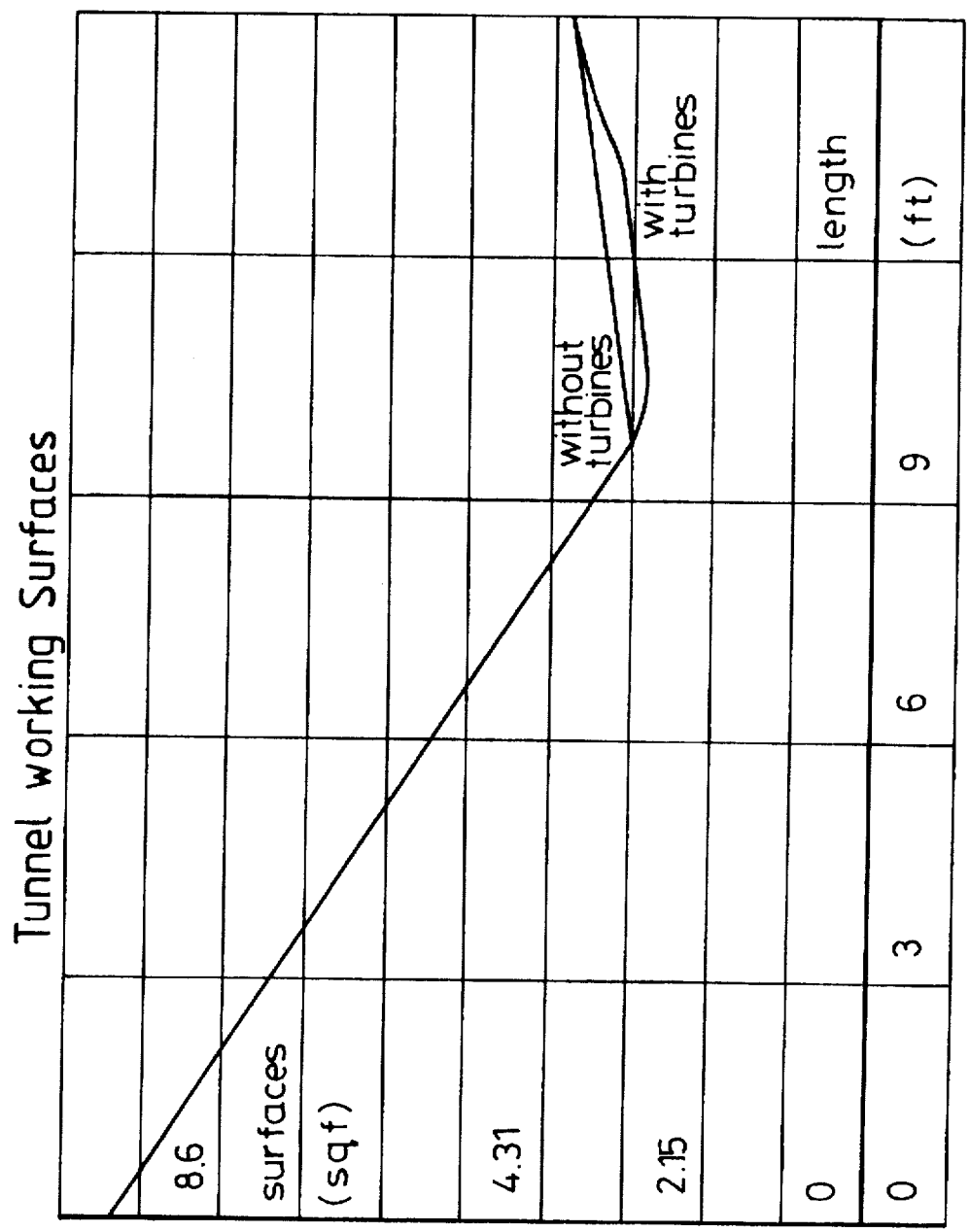
FIG. 8 is a graph of possible tunnel working surfaces.
Figure 9:
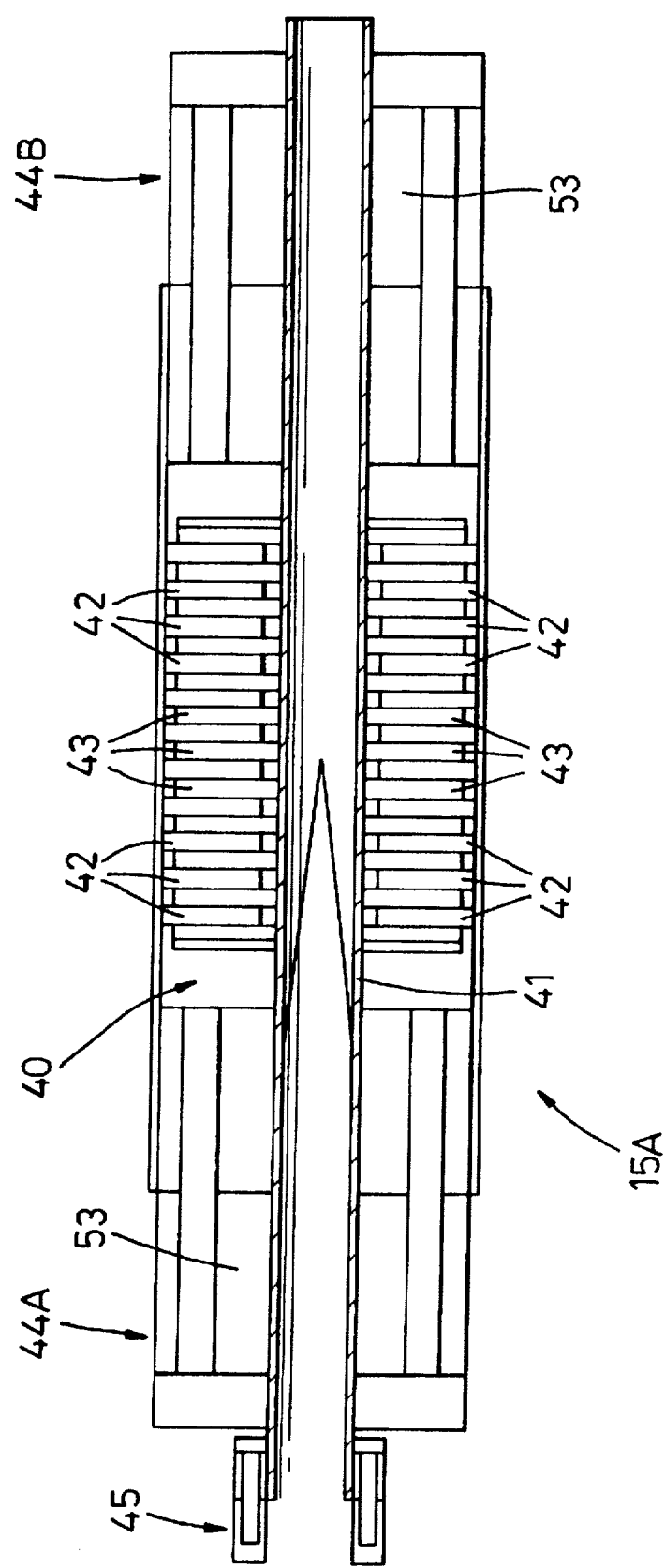
FIG. 9 is a schematic elevational view of an electricity generator in accordance with the present invention and suitable for use in the electric car of FIG. 1.

The above turbine/alternator arrangement utilising the double contra-rotating fan sets will give an increased electrical power output in comparisson to the equivalent arrangement described in GB-A-2271536. Also, the double-fan turbine with its pronounced streamline form provides a very low drag factor. FIG. 7 shows typical graphs of power, drag and fan speed attainable with the present turbine as a relation of vehicle speed (m.p.h.) The alternator 15 may have an output of 30 KVA. FIG. 8 shows a typical relation of tunnel working surface cross section (ft²) with respect to position in the tunnel length, for the case of the turbine present and without the turbine. Each turbine fan 14A/14B could run up to 1000 RPM but it would be possible for the fans to run at different speeds.

In respect of the generator 15A fitted in the electrical car the following performance is possible:

| Speed of | M/S | <10 | 15 | 20 | 30 | 40 |
|---|---|---|---|---|---|---|
| Electric Car | M.P.H | <22 | 33 | 44 | 66 | 88 |
| Fan Speed R.P.M. | single (Absolute) | 0 | 126 | 254 | 470 | 685 |
| | Double (Relative) | 0 | 252 | 508 | 940 | 1270 |
| Power on Load K.W. | | 0 | 2 | 9 | 17 | 17 |
| Moment of Resistance N.M. | | 0 | 20 | 30 | 26 | 10 |
| Fan Exit Speed V. | | 0 | 21 | 42 | 58 | 58 |
| Frequency of Current H2. | | 0 | 25 | 50 | 94 | 127 |
| Current of Load A. | | 0 | 9 | 18 | 25 | 25 |
| Excitation Current A. | | 0 | 2.5 | 2.5 | <2.6 | <1.8 |
| Voltage of Excitation. | | 0 | 88 | 88 | <70 | <45 |

Modifications are possible, for example in the way the alternator is arranged and two separate alternators could be used. It will be understood that the double turbine fan/alternator of the present invention could have uses other than in electrical vehicles, for example in an electrical generator powered by normal atmospheric wind flows or indeed as a water turbine of pelton wheel type.

Also, instead of the turbine/alternator 7/15 (15A) delivering power solely to the batteries 6A/6B, it would be possible to have the turbine/alternator 7/15 (15A) supply power directly to the electric motor 5 of the car, and an appropriate switching system could be provided to bring in the batteries for power supply to the motor 5 as back up at appropriate times and also return the turbine/alternator to supplying power to the batteries 6A, 6B.

I claim:

1. An electricity generator of a form having its length substantially greater than its diameter, said generator comprising:

a rotary shaft, a hub surrounding said shaft and capable of rotating in a direction contrary to the rotary direction of said shaft, said shaft and hub being separately rotatable, a first set of electrical component members defining an excitable magnetic field producing component and a second set of electrical component members defining a power producing component, one of said sets of electrical components being carried by said rotary shaft while the other set is carried by said hub, the electrical component members of said first and second sets extending radially to the shaft with the component members of one set alternating in close side-by-side relationship with the component members of the other set, the component members of the sets comprising an annular array of segments, each segment comprising an individual pair of spaced segmental shaped plates with an electrical winding supported between the plates, supply means for supplying excitation current to said first set of electrical component members, and discharge means for delivery of electrical power from the second set of electrical component members.

2. An electricity generator as claimed in claim 1, further including mechanical contact means for current take-off in any one of said supply means and discharge means.

3. An electricity generator as claimed in claim 1, further including a contactless current take-off in any one of said supply means and discharge means, said contactless current take-off comprising a transformer with primary and secondary sections, one of said sections being rotatable and electrically connected to a respective one of said components of the generator, the other section of the transformer being stationary.

4. An electricity generator as claimed in claim 1, wherein circuit means are provided to take alternating current from the discharge from the induction power component to serve as excitation current for the excitable component, said circuit means including rectifier means to convert said current to direct current suitable as an excitation current for the excitable component.

5. Electricity generating apparatus including:

a fan assembly and an electricity generator, said electricity generator being of a form having its length substantially greater that its diameter, said generator comprising:

(a) a rotary shaft, (b) a hub surrounding said shaft and capable of rotating in a direction contrary to the rotary direction of said shaft, said shaft and hub being separately rotatable, (c) a first set of electrical component members defining an excitable magnetic field producing component and a second set of electrical component members defining a power producing component, one of said sets of electrical components being carried by said rotary shaft while the other set is carried by said hub, the electrical component members of said first and second sets extending radially to the shaft with the component members of one set alternating in close side by side relationship with the component members of the other set, the component members of the sets comprising an annular array of segments, each segment comprising an individual pair of spaced segmental shaped plates with an electrical winding supported between the plates, (d) supply means for supplying excitation current to said first set of electrical component members, and (e) discharge means for delivery of electrical power from the second set of electrical component members, fan assembly comprising two co-axially arranged hubs, two adjacent fan blade sets mounted on respective ones of said co-axially arranged hubs, the blades of the sets being arranged for rotation in contra-directions when subject to impingement by a fluid flow, one of the fan sets driving one of said components of the generator while the other fan set drives the other component of said generator.

6. Electricity generating apparatus as claimed in claim 5, wherein the foremost hub of the fan assembly is provided with a tapering forward facing nose.

7. Electricity generating apparatus as claimed in claim 5, wherein the rearmost hub of the fan assembly has a rearward facing tapering nose.

8. Electricity generating apparatus as claimed in claim 5, wherein the blades are helically arranged on their hubs.

9. Electricity generating apparatus as claimed in claim 8, wherein the blades have an axial length greater than their radial dimension.

10. An electrical vehicle including:

bodywork, an electric motor for driving of the vehicle, electrical battery means for supplying power to the motor, and an electricity generating apparatus including:

(a) a fan assembly and (b) an electricity generator, said electricity generator being of a form having its length substantially greater than its diameter, said generator comprising:

(1) a rotary shaft, (2) a hub surrounding said shaft and capable of rotating in a direction contrary to the rotary direction of said shaft, said shaft and hub being separately rotatable, (3) a first set of electrical component members defining an excitable magnetic field producing component and a second set of electrical component members defining a power producing component, one of said sets of electrical components being carried by said rotary shaft while the other set is carried by said hub, the electrical component members of said first and second sets extending radially to the shaft with the component members of one set alternating in close side-by-side relationship with the component members of the other set, the component members of the sets comprising an annular array of segments, each segment comprising an individual pair of spaced segmental plates with an electrical winding supported between the plates, (4) supply means for supplying excitation current to said first set of electrical component members, and (5) discharge means for delivery of electrical power from the second set of electrical component members, the fan assembly comprising two co-axially arranged hubs and two adjacent fan blade sets mounted on respective ones of said co-axially arranged hubs, the blades of the sets being arranged in rotation in contra-directions when subject to impingement by a fluid flow, one of the fan sets driving one of said components of the generator while the other fan set drives the other component of said generator, and ducting permitting a flow of air to the fan assembly of said electricity generator apparatus by virtue of the vehicle motion to drive the fan assembly.

11. An electrical vehicle as claimed in claim 8, wherein the ducting has an open end at the front of the vehicle.

12. An electrical vehicle as claimed in claim 9, wherein said open end is of bell-mouth form.

13. An electrical vehicle as claimed in claim 9, wherein said open front end has an area greater than half of the maximum cross-sectional area of the vehicle.

14. An electrical vehicle as claimed in claim 8, wherein the electricity generating apparatus is located at or towards the rear of the vehicle, the ducting passing through the bodywork from the vehicle front to the fan assembly of the electricity generating apparatus.

15. An electrical vehicle as claimed in claim 8, wherein the ducting cross sectional form changes along its length, the front being of generally rectangular shape while the mid portion of the ducting is of generally oval form and a reduced cross sectional area relative to the front.

* * * * *